United States Patent [19]

Marshall, Jr.

[11] 4,221,436
[45] * Sep. 9, 1980

[54] SIMULATED WIRE WHEEL COVER

[75] Inventor: Claude J. Marshall, Jr., Ann Arbor, Mich.

[73] Assignee: Rockwell International Corporation, Pittsburgh, Pa.

[*] Notice: The portion of the term of this patent subsequent to Sep. 18, 1996, has been disclaimed.

[21] Appl. No.: 77,522

[22] Filed: Sep. 21, 1979

Related U.S. Application Data

[63] Continuation of Ser. No. 894,250, Apr. 7, 1978, abandoned.

[51] Int. Cl.³ .............................................. B60B 7/04
[52] U.S. Cl. ................................................ 301/37 SS
[58] Field of Search .................... 301/37 SS, 37 P, 62, 301/66, 104, 37 R

[56] References Cited

U.S. PATENT DOCUMENTS

| 3,174,803 | 3/1965 | Mulhern et al. | 301/37 SS |
| 4,009,911 | 3/1977 | Apczynski | 301/37 SS |
| 4,166,653 | 9/1979 | Claucherty | 301/37 SS |
| 4,178,043 | 12/1979 | Beisch et al. | 301/37 SS |

FOREIGN PATENT DOCUMENTS 532673  8/1955  Italy .................................... 301/37 SS Primary Examiner—Charles A. Marmor

[57] ABSTRACT

A simulated wire wheel cover for attachment to the wheel of a vehicle comprising a rim portion which has a plurality of holes therethrough to receive ends of at least one series of nested substantially V-shaped members. The V-shaped members are provided with outwardly facing conically shaped ends which are in intimate contact with the annular surfaces defining the holes to firmly position the V-shaped members and to limit the travel of the members through the holes of the rim portion. The wheel cover has a body portion radially inward of the rim portion and is provided with at least one circular camming surface in the region of the apex of each of the substantially V-shaped members which bear upon the camming surface.

1 Claim, 7 Drawing Figures

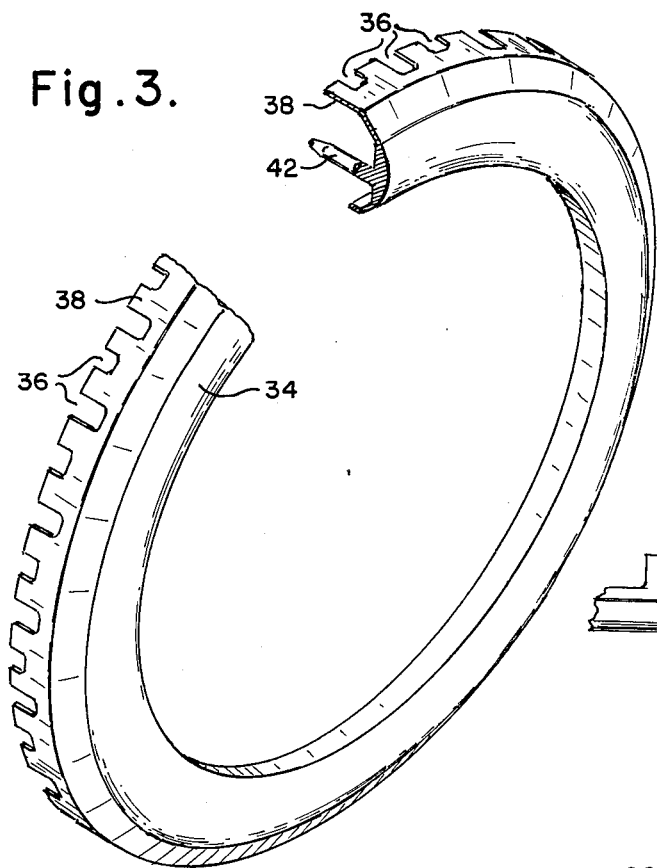
Fig. 3.
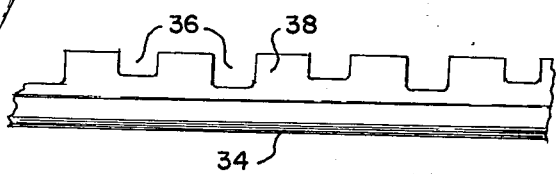
Fig. 4.
Fig. 7.
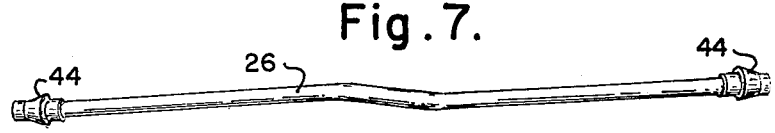
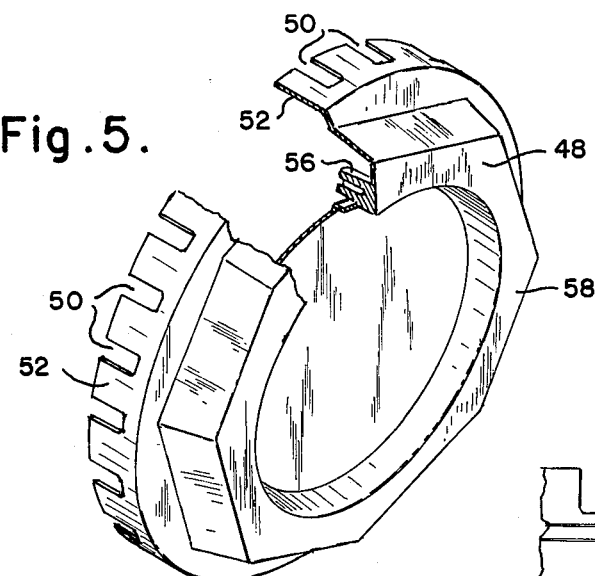
Fig. 5.
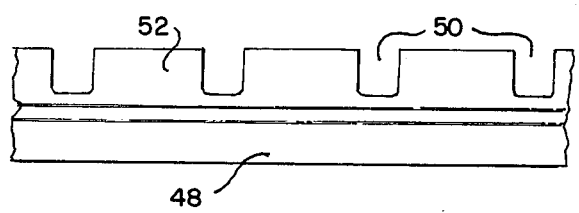
Fig. 6.

SIMULATED WIRE WHEEL COVER

This is a continuation of application Ser. No. 894,250 filed Apr. 7, 1978, now abandoned.

CROSS-REFERENCE TO RELATED APPLICATION

This application is an improvement of pending prior application Ser. No. 925,068 filed by Claude J. Marshall, Jr. on July 17, 1978, now U.S. Pat. No. 4,168,016 issued Sept. 18, 1979, which is a continuation of application Ser. No. 809,573, filed June 24, 1977, abandoned, and assigned to the assignee of this application.

BACKGROUND OF THE INVENTION

1. Field of the Invention

This invention relates generally to wheel covers and, more specifically, to those types of wheel covers having simulated radially projecting members.

2. Description of the Prior Art

Such simulated wire wheel covers have been finding greater acceptance from sports car enthusiasts and other automobile afficianados who desire to enhance the aesthetic appearance of their automobile. In fact, such simulated wire wheel covers have been applied also to various types of trucks for the same general aesthetic appearance.

The use of simulated wire wheel covers, however, in the past has not been without certain problems both in terms of their manufacture and their final use. With respect to the former, the prior art forms of simulated wire wheel covers have been expensive to manufacture and required complicated tooling and multitudinous machining and forming steps. With respect to the latter, the prior art forms of simulated wire wheel covers have been excessively heavy and susceptible to misalignment. Because of such weight problems, the prior art forms of simulated wire wheel covers had to be specifically balanced before they could be assembled on the wheel rim. This required an additional step in the manufacturing process and also required the application of weights to the wheel cover to bring it into balance. If such a heavy wheel cover was damaged, for example, bent or hit by a rock or other projectile, it could become out of balance thereby subjecting the wheel to which it is attached to unbalanced dynamic forces. These unbalancing forces have the same effect as an unbalanced wheel and tire assembly and could cause premature wear of the tire and wear of the wheel bearings etc.

It should also be pointed out that prior art forms of simulated wire wheel covers, because of their excessive weight, require special retention systems to maintain their assembly to the wheel rim. These special retention systems add an additional weight and cost penalty.

SUMMARY OF THE INVENTION

Accordingly, it is the primary object of the present invention to provide a simulated wire wheel cover which comprises a rim portion having retention means attached thereto for attachment to the wheel of a vehicle. The rim portion has a plurality of holes therethrough to receive ends of at least one series of nested substantially V-shaped members. The V-shaped members are provided with outwardly facing conically shaped ends which are in intimate contact with the annular surfaces defining the holes to firmly position the V-shaped members and to limit the travel of the members through the holes of the rim portion. The wheel cover has a body portion radially inward of the rim portion and is provided with at least one circular camming surface in the region of the apex of each of the substantially V-shaped members which bear upon the camming surface. Means are attached to the body portion to capture and force each of the V-shaped members against the camming surface to drive each of them toward the rim portion.

Another further object of the present invention is to provide a simulated wire wheel cover which is relatively easy to manufacture using relatively inexpensive materials and high volume forming and machining techniques.

A still further object of the present invention is to provide a simulated wire wheel cover that presents a highly desirable aesthetic appearance and which includes a highly efficient mechanically interlocking method of assembly and does not rely on welding or other high temperature energy absorbing methods and techniques.

A still further object of the present invention is to provide a simulated wire wheel cover having two series of nested substantially V-shaped hollow tubular members. One series of the V-shaped members has a greater height than the other with respect to the rim portion. There are two circular camming surfaces in the region of each series of V-shaped members. Two clamping members are attached to the body portion of the wheel cover and each captures and forces a respective series of the V-shaped members.

It is yet another object of the present invention to provide camming surfaces, which are truncated conical surfaces, on the body portion of the wheel cover and are coaxial with each other and the stop means includes upset portions provided at the end of each of the V-shaped tubular members. The upset portions are substantially circular in cross section and are provided with a circular bead intermediate their ends.

A still further object of the present invention is to provide the larger series of tubular V-shaped members so formed that one leg of the V is offset with respect to the other to effect the nesting of the series of larger tubular members.

It is still another object of the present invention to provide a simulated wire wheel cover which is substantially lighter in weight than the prior art forms of simulated wire wheel covers.

Other objects and advantages of the present invention will become apparent from the following specification, claims and drawings.

BRIEF DESCRIPTION OF THE DRAWINGS

FIG. 3 is an isometric view of the clamping means of FIG. 1 with a portion cut away.

FIG. 4 is a partial top plan view of the clamping means of FIG. 3.

FIG. 5 is an isometric view of another clamping means of FIG. 1 with a portion cut away.

FIG. 6 is a partial top plan view of the clamping means of FIG. 5.

FIG. 7 is a top plan view of the larger V-shaped members of FIG. 1.

DESCRIPTION OF THE PREFERRED EMBODIMENTS

Figure 2:
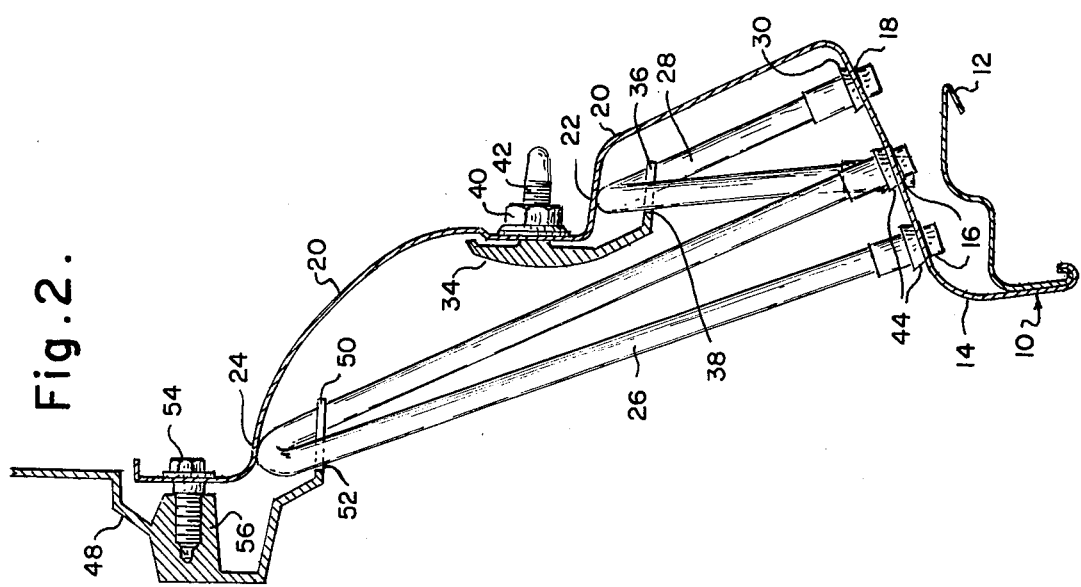
FIG. 2 is a partial cross sectional view taken along the line 2—2 of FIG. 1.
Figure 1:
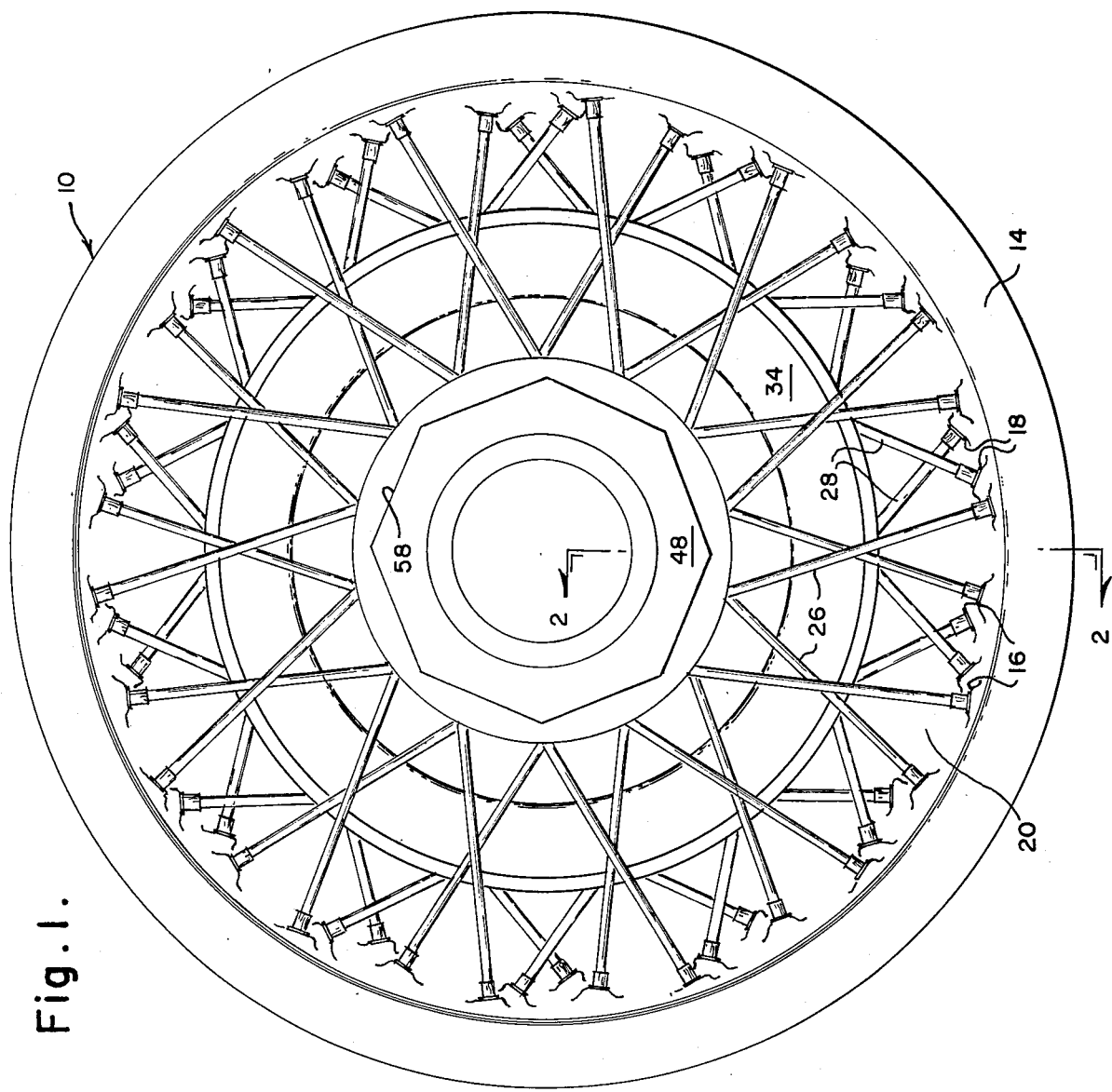
FIG. 1 is a side elevational view of a simulated wire wheel cover in accordance with the present invention.

Referring now to the drawings and in particular to FIGS. 1-7, there is shown a simulated wire wheel cover 10. The wire wheel cover 10 is particularly adapted for assembly to an automobile or similar wheel (not shown) using a conventional retention means 12 which may have a scolloped or other formed section to grasp the inner flange of the wheel. The retention means or fingers 12 are fixedly attached to the wheel cover 10 and, in particular, in the area of the rim portion 14 thereof. The annular rim 14 is provided with a first and second series of holes therethrough 16 and 18 respectively, the function of which will be described in further detail below. It can be seen in FIGS. 1 and 2 that the first series of holes 16 are slightly canted with respect to the annular rim portion 14 while the second series of holes 18 are canted at a greater angle with respect to the rim portion 14 than the first series of holes 16.

The wheel cover 10 is provided with a central body portion 20 which may be formed integrally with the rim portion 14. The body portion 20 is provided with a first circular camming surface 22 and a second circular camming surface 24. The first and second circular camming surfaces 22 and 24 may be formed in the shape of a truncated conical surface. This feature can best be seen in FIG. 2 and will be described in greater detail below.

The wheel cover 10, in accordance with the present invention, has assembled within it two series of nested substantially V-shaped members having a greater height than the other or second series of substantially V-shaped members 28. The specific number of V-shaped members 26 or 28 in a particular array thereof may be determined based upon the desired aesthetic effect.

Referring now to the nested substantially V-shaped members 28, it can be seen in FIG. 2 that the apex of such members bears upon the first circular camming surface 22 and further that the ends thereof are received within the angularly canted holes 18. These substantially V-shaped members 28 are provided with outwardly facing conically shaped ends 30 at each end thereof. The conically shaped ends are formed from the material of the V-shaped members and may be an upset portion thereof. The outwardly facing conically shaped ends of the substantially V-shaped members may be truncated in that they may be provided with a conical portion 31 which is merely a continuation of the conical section of the substantially V-shaped members 28. The conical sections 30 are in intimate contact with the annular surfaces defining the angularly canted holes 18. The substantially V-shaped member 28 is mechanically fixed within the wheel cover 10 by the assembly of a circular clamping member 34. The circular clamping member 34, which can best be seen in FIG. 3, is provided with a series of notches 36 in its axially depending circular lip 38. The clamping member 34, therefore, captures in each of the notches 36 each leg of each V-shaped member 28. When the clamping member is attached to the body portion 20 by suitable fastening means, such as a nut 40 threadedly attached to a threaded stud 42, it will tend to force the V-shaped member 28 at its apex axially toward the body portion and down the first circular camming surface 22. This action results in the substantially V-shaped member 28 being driven toward the rim portion 14. As the substantially V-shaped member 28 is so driven toward the rim portion 14 the conical end 32 will come into intimate contact with the rim portion 14 thereby effectively locking each of the substantially V-shaped members 28 in place on the wheel cover 10.

It may be generally stated that the first series of V-shaped members 26 are mechanically interlocked within the wheel cover 10 in a fashion similar to that of the substantially V-shaped members 28. More particularly, the apex of each of the substantially V-shaped members 26 bears upon the second circular camming surface 24 which, as before noted, is of a truncated conical form. The substantially V-shaped members 26 are each provided with outwardly facing conical ends 44 which are received in and in intimate contact with the annular surfaces defining holes 16. The conical ends 44, as with the conical ends 30, are raised portions of the substantially V-shaped members 26 and may be truncated such that their ends 45 are circular in cross section and a mere continuation of the circular cross section of the substantially V-shaped members 26. A clamping member 48 performs substantially the same function as the clamping member 34 in that it is provided with a series of notches 50 in its axially depending circular lip 52. As before mentioned with respect to clamping member 34, clamping member 48 captures each leg of the substantially V-shaped members 26 in each of the notches 50 provided in the lip 52. As the clamping member 48 is assembled to the body portion 20 by suitable fastening means, such as threaded studs 54, the apex of the substantially V-shaped members 26 will be forced to bear upon in an axially inward direction with respect to the body portion 20 on the second circular camming surface 24. This action of the clamping member 48 also drives each of the substantially V-shaped members 26 toward the rim portion 14 whereupon each of the conical ends 44 will therefore come into intimate contact with the annular surfaces which define the holes 16 provided on the rim portion 14. This action mechanically interlocks each of the substantially V-shaped members 26 within the wheel cover 10. The clamping member 48 may be provided with a threaded boss 56 to accept the threaded stud 54.

The clamping member 48 may also be provided with a decorative design such as a simulated nut 58 or other suitable decorative designs or styles.

To enhance the nesting characteristics of the substantially V-shaped members 26, they may be formed such that one leg thereof is offset with respect to the other in a somewhat sinusoidal fashion. This feature may best be seen in FIG. 7.

As before mentioned, the specific number of the substantially V-shaped members 26 or 28 in a particular array may be varied based upon the desired aesthetic effect. Further, the simulated wire members 26 or 28 may be changed in overall general configuration also depending upon the aesthetic effect.

It can be seen from the above that the simulated wire wheel cover is generally simplistic in design and is suseptible to inexpensive, high volume automated techniques using somewhat simplistic tools, dies, jigs and fixtures. The selection of material for the various parts will depend upon environment, application and the desired aesthetic appearance. For example, all the various component parts could be made from a wide range of materials including stainless steel, aluminum or even molded plastic or zinc die casting. In that regard, the overall aesthetic appearance of the wheel cover 10 can be greatly altered by the restyling of the exterior of the clamping member 48.

In any event, it is to be understood that the specific construction and the above noted details of the improved wheel cover herein disclosed and described are presented for the purpose of explanation and illustration and are not intended to indicate limits of the invention, the scope of which is defined by the following claims.

I claim:

1. A simulated wire wheel cover comprising: a rim portion having retention means attached thereto for attachment to the wheel of a vehicle, said rim portion having a plurality of holes therethrough to receive outwardly faced conically shaped ends of at least one series of nested substantially V-shaped simulated wire members the ends of which are in intimate contact with the annular surface defining said holes to limit the travel of said members through said holes; the body portion of said wheel cover which is radially inward of said rim portion being provided with at least one truncated conical camming surface in the region of the apex of each of said substantially V-shaped simulated wire members which bear upon said truncated conical camming surface; means attached to said body portion to capture and force each of said simulated wire members against said truncated conical camming surface to drive each of them toward said rim portion whereupon each of said conically shaped ends are maintained in intimate contact with said rim portion thereby locking each of said simulated wire members in place.

* * * * *